July 24, 1956  A. L. BROWNLEE ET AL  2,756,356
FIELD MAGNET UNIT FOR FLYWHEEL MAGNETOS
Filed Sept. 16, 1953  2 Sheets-Sheet 1
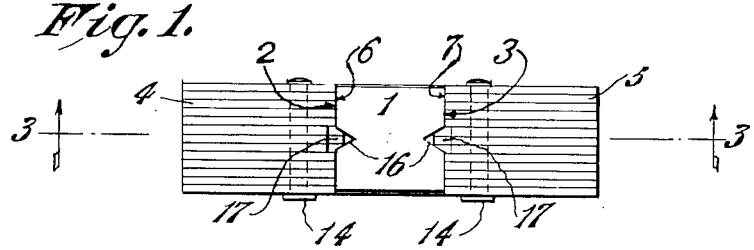
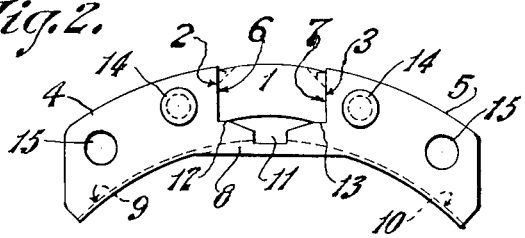
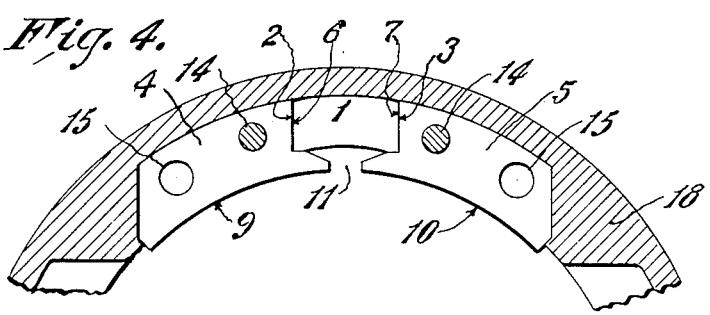
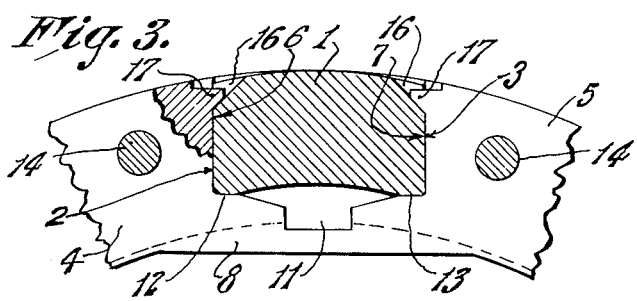
INVENTORS
Allen L. Brownlee and
Terrence G. Louis,
BY *Chapin + Neal*
ATTORNEYS INVENTORS
Allen L. Brownlee and
Terrence G. Louis,
BY Chapin & Neal
ATTORNEYS

United States Patent Office 2,756,356
Patented July 24, 1956

2,756,356

FIELD MAGNET UNIT FOR FLYWHEEL MAGNETOS

Allen L. Brownlee, Westfield, Mass., and Terrence G. Louis, North Haven, Conn., assignors, by mesne assignments, to Globe-Union Inc., a corporation of Delaware Application September 16, 1953, Serial No. 380,475

2 Claims. (Cl. 310—153)

This invention relates to an improved field magnet unit for use in flywheel magnetos.

A field magnet unit for such use commonly includes a permanent bar magnet and two shoes which are made up of laminations of paramagnetic material and which are fixed one to each polar end of the magnet. Such a unit is suitably fixed to the flywheel of an engine and then the inner faces of the pole shoes are finished to lie in true coaxial relation with the flywheel. Sometimes, the field magnet unit is secured to the flywheel by embedding it therein during the casting of the flywheel and sometimes the unit is secured to the flywheel by screws. However, irrespective of how the field magnet unit is held to the flywheel, the three parts of this unit must be held together in proper relation during the assembly of the unit in the flywheel.

Prior art examples of means for initially holding in assembled relation the components of a field magnet unit, such as above described, will be found in the Kenneth A. Harmon Patent No. 2,101,392, and the Allen L. Brownlee Patent No. 2,470,467, granted to the assignee of this application on December 7, 1937 and May 17, 1949, respectively. In each of these patents, the magnet and the shoes are shown as clamped between two thin side plates of non-magnetic material. These plates also prevent movement of the magnet on its seat. In addition, there are shown in the Brownlee patent, lugs, which are located one centrally of each side plate and which are bent over on top of the magnet in order to hold the latter against movement away from its seat.

This invention has for an object the provision in a field magnet unit of the kind described, of improved means for holding the two pole shoes and the magnet together in proper relation until they are permanently fixed in place in the engine flywheel, such means being characterized in that the several components of the unit are interlocked in a simple and inexpensive way without the use of any additional binding elements for the purpose.

The invention will be disclosed with reference to the illustrative embodiments of it in the accompanying drawings, in which Fig. 1 is a top plan view of a field magnet unit embodying the invention;

Fig. 2 is a front elevational view thereof;

Fig. 3 is a fragmentary sectional elevational view taken on the line 3—3 of Fig. 1 and drawn to a larger scale;

Fig. 4 is a fragmentary sectional elevational view of an engine flywheel, showing the field magnet unit of Figs. 1, 2 and 3 embedded in the flywheel by die casting;

Figure 5:
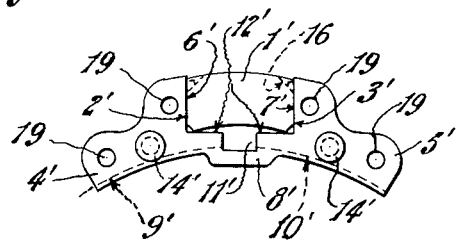
Fig. 5 is a front-elevational view showing a similar kind of field magnet unit which has provisions for fastening it to a flywheel with screws.

Referring to these drawings, and first to Figs. 1, 2 and 3 thereof; the field magnet unit comprises a permanent bar magnet 1, opposite polar ends 2 and 3 of which are ground flat and parallel, and two pole shoes 4 and 5, which are made up of laminations of suitable paramagnetic material and which have flat faces 6 and 7 to respectively abut the flat polar ends 2 and 3 of the pole shoes 4 and 5, respectively. These two shoes are integrally united by a portion 8, which lies below the magnet and is subsequently removed when the pole shoes are finished along the dotted line shown in Figs. 2 and 3 to form the curved faces 9 and 10, which are located coaxially of the engine flywheel. This connecting portion is located inside the cylindrical surface in which the curved faces 9 and 10 are disposed. Thus, when the shoes are subsequently finished, the connecting portion 8 is cut away and an air gap 11 is left between the proximal ends of the two shoes. The shoes 4 and 5 have seats 12 and 13 respectively inturned one from each of the faces 6 and 7 toward the other.

One piece laminations, each comprising two shoe portions and an interconnecting portion, are punched out in the usual manner and a suitable number of such laminations are placed one upon another in stack formation and then secured together by two rivets 14. Where the unit is to be die cast into the flywheel, suitable holes such as 15 are provided one in each shoe near the distal ends thereof to receive pins in the mold which retain the unit in proper position during the casting process.

The two shoes of the field magnet unit are initially held together by the connecting part 8. The ends of the magnet 1 are finished, as for example by grinding, to form the flat parallel faces 2 and 3 and these are spaced apart by a distance equal to that between the faces 6 and 7 of the laminated shoes. The magnet 1 is then put in place with portions of its inner face, near the polar ends thereof, engaged one with each of the seats 12 and 13 and with its polar faces 2 and 3 respectively engaged with the faces 6 and 7 of the pole shoes.

The magnet 1 is provided in its outer face with two small notches 16, located one near each polar end thereof. The magnet is held to its seats 12 and 13 simply by punching a portion 17 of the shoes into the notches 16. This interlocks each shoe with the magnet and prevents vertical movement of the engaged faces 2, 6 and 3, 7 as well as horizontal movement of the magnet along the seats 12 and 13 in a direction parallel with the axis of the curved polar surfaces 9 and 10. The magnet 1 is thus held in position against movement out of the space between the shoes in a very simple and inexpensive manner and yet in a manner that is wholly adequate for the purpose.

Fig. 4 shows how the field magnet unit described appears after it has been fixed by die casting in an engine flywheel, shown in part at 18, and finished as described to form the curved faces 9 and 10 and eliminate the connecting portion 8.

Fig. 5 shows another field magnet, which has holes 19 through each shoe to receive fastening screws. Except for these holes and immaterial differences in the shape of the pole shoes, the field magnet unit is the same as above described and corresponding parts have been given the same reference numerals with the addition of a prime.

Figure 6:
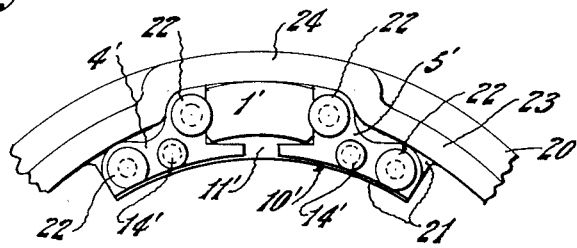
Fig. 6 is a fragmentary sectional view of an engine flywheel having the field magnet unit of Fig. 5 fixed thereto by screws.

Fig. 6 shows a portion of an engine flywheel 20 and illustrates how the field magnet unit of Fig. 5 is fixed thereto. One side of the unit abuts a flat pad 21 on the flywheel and drive screws 22 passing through the described holes 19 enter this pad and securely hold the unit thereto. The outer face of each shoe may abut the inner surface of a rim 23 and the outer face of magnet 1 may abut the inner surface of an offset portion 24 of such rim.

The invention thus provides improved means for holding in assembled relation the magnet and pole shoes that form a field magnet unit for a flywheel magneto and the result is accomplished without the use of additional parts, such as are shown in the prior patents above identified. The result is effected by inter-locking the pole shoes and magnet which effectively holds the magnet against movement on or away from its seat on the pole shoes.

What is claimed is:

1. A field magnet unit for flywheel magnetos, comprising, a paramagnetic structure made up of a plurality of one-piece laminations bound together into a stack and affording two pole shoes, the proximal ends of which are spaced apart to form an air gap therebetween and each of which has a part-cylindrical face, and a member located inside the cylindrical surface in which said faces are disposed for interconnecting such faces adjacent said proximal ends, said pole shoes having flat parallel confronting faces and seats turned inwardly at right angles one from each such flat face toward the other; and a permanent magnet, having flat parallel polar ends, engaged one with each of the flat parallel faces of the pole shoe, and an inner face, the ends of which are engaged one with each of said seats, said magnet having in its outer face notches one at each end thereof; each pole shoe having a portion punched into the adjacent notch to hold the magnet against sidewise movement on said seats and to hold the ends of said inner face engaged one with each of said seats.

2. In a flywheel magneto, having a flywheel and a field magnet unit fixed thereto; said unit being of the type consisting of two laminated pole shoes, the proximal ends of which are spaced apart angularly of the flywheel to form an air gap therebetween said shoes having curved faces coaxial with the flywheel and inter-connecting the proximal and distal ends of the shoes, and a permanent magnet having inner and outer faces interconnected by two flat parallel polar faces, said shoes having flat parallel confronting faces and seats turned inwardly at right angles one from each such flat face toward the other, the inner face of said magnet having end portions engaged one with each said seat, the polar faces of said magnet being engaged one with each of the flat parallel faces of the pole shoes, said magnet having notches in its outer face one at each polar end thereof, and said shoes having portions pressed into said notches to retain the magnet against movement away from or transversely of said seats.

References Cited in the file of this patent

UNITED STATES PATENTS

| 1,991,046 | Bohli | Feb. 12, 1935 |
| 2,101,392 | Harmon | Dec. 7, 1937 |

FOREIGN PATENTS

| 181,069 | Switzerland | Feb. 17, 1936 |
| 797,880 | France | Feb. 24, 1936 |